United States Patent
Ahmavaara (10) Patent No.: US 7,242,933 B1
(45) Date of Patent: Jul. 10, 2007

(54) RELOCATION IN A COMMUNICATION SYSTEM

(75) Inventor: Kalle Ahmavaara, Espoo (FI)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 10/088,452

(22) PCT Filed: Sep. 13, 2000

(86) PCT No.: PCT/EP00/09100

§ 371 (c)(1),
(2), (4) Date: Jun. 5, 2002

(87) PCT Pub. No.: WO01/20938

PCT Pub. Date: Mar. 22, 2001

(30) Foreign Application Priority Data

Sep. 14, 1999 (GB) ................................. 9921706.9

(51) Int. Cl.
H04Q 7/20 (2006.01)
(52) U.S. Cl. ...................... 455/436; 455/439; 455/428; 370/331
(58) Field of Classification Search ........ 455/436–439, 455/442–444, 403, 422, 424, 428, 430, 433, 455/455, 414.4, 432.2; 370/331, 401, 469, 370/395.5, 395, 332
See application file for complete search history.

(56) References Cited

U.S. PATENT DOCUMENTS

| | | | | |
|---|---|---|---|---|
| 5,189,734 A * | 2/1993 | Bailey et al. | ................ | 455/438 |
| 5,557,745 A * | 9/1996 | Perlman et al. | ............. | 709/242 |
| 5,917,811 A * | 6/1999 | Weaver et al. | ............... | 370/332 |
| 6,201,969 B1 * | 3/2001 | Meier | .......................... | 455/442 |
| 6,301,479 B1 * | 10/2001 | Roobol et al. | .............. | 455/436 |
| 6,304,556 B1 * | 10/2001 | Haas | .......................... | 370/254 |
| 6,374,112 B1 * | 4/2002 | Widegren et al. | ........ | 455/452.2 |
| 6,473,411 B1 * | 10/2002 | Kumaki et al. | ............. | 370/331 |
| 6,542,516 B1 * | 4/2003 | Vialen et al. | ............... | 370/465 |
| 6,542,743 B1 * | 4/2003 | Soliman | ..................... | 455/436 |
| 6,574,473 B2 * | 6/2003 | Rinne et al. | ................. | 455/436 |
| 6,587,680 B1 * | 7/2003 | Ala-Laurila et al. | ........ | 455/411 |
| 6,628,632 B1 * | 9/2003 | Dolan | ........................ | 370/332 |
| 6,658,011 B1 * | 12/2003 | Sevanto et al. | ............. | 370/401 |
| 6,674,765 B1 * | 1/2004 | Chuah et al. | ................ | 370/458 |
| 6,687,249 B1 * | 2/2004 | Noguera-Rodriguez et al. | .......................... | 370/331 |
| 6,725,038 B1 * | 4/2004 | Subbiah | ...................... | 455/436 |
| 6,912,230 B1 * | 6/2005 | Salkini et al. | .............. | 370/466 |

FOREIGN PATENT DOCUMENTS

| | | |
|---|---|---|
| CH | 682687 | 9/1991 |
| EP | 0898438 | 2/1999 |
| JP | 205842/1999 | 7/1999 |
| WO | 9951051 | 10/1999 |

* cited by examiner

Primary Examiner—CongVan Tran
(74) Attorney, Agent, or Firm—Alfred A. Fressola; Ware, Fressola, Van Der Sluys & Adolphson LLP (57) ABSTRACT

The present invention relates to relocation of a protocol termination point in a communication system comprising a first protocol termination point, a second protocol termination point and control means for relocating a first protocol from the first protocol termination point to the second protocol termination point. A protocol initialization unit that contains predefined information of the first termination point is defined by means of the first protocol. The protocol initialization unit is subsequently transferred from the first termination point to the second termination point by means of a second protocol. The second termination point is initialized based on the received protocol initialization unit.

34 Claims, 3 Drawing Sheets

RELOCATION IN A COMMUNICATION SYSTEM

CROSS-REFERENCE TO RELATED APPLICATIONS

Priority is claimed from International Application PCT/EP00/09100 filed 13 Sep. 2000, which in turn claims priority from Great Britain application GB 9921706.9 filed 14 Sep. 1999.

FIELD OF THE INVENTION

The present invention relates to relocation in a communication system and in particular, but not exclusively, to relocation of a protocol termination point.

BACKGROUND OF THE INVENTION

Communication networks typically operate in accordance with a given standard which sets out what the elements of the network are permitted to do and how that should be achieved. The communication in the networks follows pre-defined rules which are referred to in the following as protocols. The protocols to be used are defined in the associated standard. The protocols can be used for controlling various events and functionalities in a connection provided through the communications network. Several protocols may be simultaneously in an active state for providing control of a connection. During an ongoing i.e. active connection a protocol is having a termination point in the network element controlling the connection. For example, a protocol may have termination points in a telephone terminal and in a network controller controlling the connection.

A communication network is a cellular radio network consisting of cells. In most cases the cell can be defined as a certain area covered by one or several base transceiver stations (BTS) serving mobile stations (MS) via a radio interface and connected to a base station subsystem (BSS). Several cells cover a larger area, and form the coverage area of a cellular radio network. The cell (or group of cells) and thus the mobile station (MS) or similar user equipment (UE) within one of the cells of the system can be controlled by a node providing controller functionality, for example by a radio network controller (RNC) or a mobile switching center (MSC). The controller can be connected further to a gateway or linking node, for example a gateway GPRS support node (GGSN) or gateway mobile switching center (GSMC), linking the cell to the other parts of the communication system and/or other communication networks, such as to a PSTN (Public Switched Telecommunications Network) or to a data network, such as to a X.25 based network or to a TCP/IP (Transmission Control Protocol/Internet Protocol) based network.

The mobile station MS may be controlled by only one controller at time. However, the MS may also be simultaneously controlled by several controller nodes. This may occur e.g. when the cells overlap or in so called soft handoff mode, where the MS may be in communication with two base stations and those base stations may be connected to different controllers, or when one controller is controlling another controller controlling the MS. One controller of the plurality of controllers in the system can be defined as a serving (main) controller whereas the others may act as secondary controllers. The responsibility of controlling a connection between the mobile station and the network may change during an ongoing connection. It is therefore necessary to relocate at least part of functionalities associated with the connection such that the connection will not become disconnected and/or that the quality of the connection remains in an acceptable level. It is to be appreciated that in addition or as an alternative to relocating functionalities of the controller node, the functionality to be relocated may also be located in any other of the network elements, for example in the base station, base station subsystem, in the gateway and so on.

When relocation is decided to be performed, the serving controller or another node of the communication system may initiate the necessary proceeding for replacing one or several of the network nodes with a new corresponding node or nodes.

In case of an active i.e. ongoing connection, one of the features that should be relocated is the state of a protocol termination point. Although it is not always necessary, in a usual case the status of the protocol termination point at the new "replacing" network element or node should be such that it may take over the functions of the old "replaced" network node. At the present the parameters which need to be transferred have to be defined also in the protocols which are used to convey the information from the old termination point to the new termination point. For example, if parameters of a Radio Resource Control (RRC) or Medium Access Control (MAC) or Radio Link Control (RLC) protocols are to be relocated in a system that would use radio network subsystem application part (RNSAP) for communication between the network controller nodes, this would mean that a lot of "external" parameters would have to be defined for the RNSAP. This would increase the complexity of the RNSAP. In addition, if several additional parameters of a protocol are to be defined for another protocol, it makes these two different protocols very dependent on each other. The independent evolution of them would thus become more difficult to manage.

SUMMARY OF THE INVENTION

It is an aim of the embodiments of the present invention to address one or several of the above problems.

According to one aspect of the present invention, there is provided a method in a communication system for relocating a protocol termination point, comprising:

defining a protocol initialization unit containing predefined information of a first termination point of a first protocol by the first protocol;

transferring the protocol initialization unit from the first termination point to a second termination point by a second protocol; and initializing the second termination point based on the protocol initialization unit.

According to another aspect of the present invention there is provided a communication system, comprising:

a first protocol termination point;

a second protocol termination point;

control means for relocating a first protocol from the first protocol termination point to the second protocol termination point, said control means being arranged to form a protocol initialization unit containing predefined information of the first protocol at the first protocol termination point;

communication path based on a second protocol between the first and the second termination points for transferring the protocol initialization unit; and control means for initializing the second protocol termination point based on the protocol initialization unit.

According to a still another aspect of the present invention there is provided a network element for use in a communication network, comprising:

a protocol termination point;

control means for relocating a first protocol from the protocol termination point to another protocol termination point, said control means being arranged to form a protocol initialization unit containing predefined information of the first protocol at the protocol termination point; and interface to said other protocol termination point based on a second protocol for transferring the protocol initialization unit from the first termination point by means of the second protocol.

According to a still another aspect of the present invention there is provided a network element for use in a communication network, comprising:

a protocol termination point of a first protocol;

interface to another protocol termination point for receiving a protocol initialization unit containing predefined information of the first protocol at said other termination point, wherein the interface is based on a second protocol; and control means for initializing the protocol termination point based on the received protocol initialization unit.

According to a more specific embodiment, the protocol initialization unit may contain state information of the first protocol termination point.

The first termination point may also be located at a first network element of the communication system and the second termination point may be located at a second network element of the communication system. The second network element may, upon receiving the protocol information unit, generate and transmit a response to the first network element by means of the second protocol.

The protocol initialization unit may be encapsulated in a message transmitted between the first termination point and the second termination point. The protocol initialization unit may also be transparent for the second protocol.

The protocol initialization unit may be transmitted via a network element of a core network of the communication system.

This may be accomplished by means of a radio access network application part (RANAP) protocol. According to an embodiment, the protocol initialization unit may be transmitted directly between the termination points. This may be accomplished by means of a radio network subsystem application part (RNSAP) protocol.

The protocol initialization unit may contain information of at least one further protocol. According to an embodiment at least one further protocol initialization unit may be defined containing predefined information of a further protocol by the further protocol, whereafter the further protocol initialization unit is transferred from the first termination point to the second termination point. The further protocol initialization unit may be transferred between the termination points by a protocol that is different to the second protocol.

The parameters of the second termination point may be set into a state that is relatively similar to the state of parameters of the first termination point before or at the time the relocation procedure was initiated during the initialization procedure.

The embodiments of the invention provide several advantages. One of the benefits is that a need for defining a great number of parameters of one protocol in another protocol is avoided. This provides clear benefits in updating and maintenance of the protocols.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
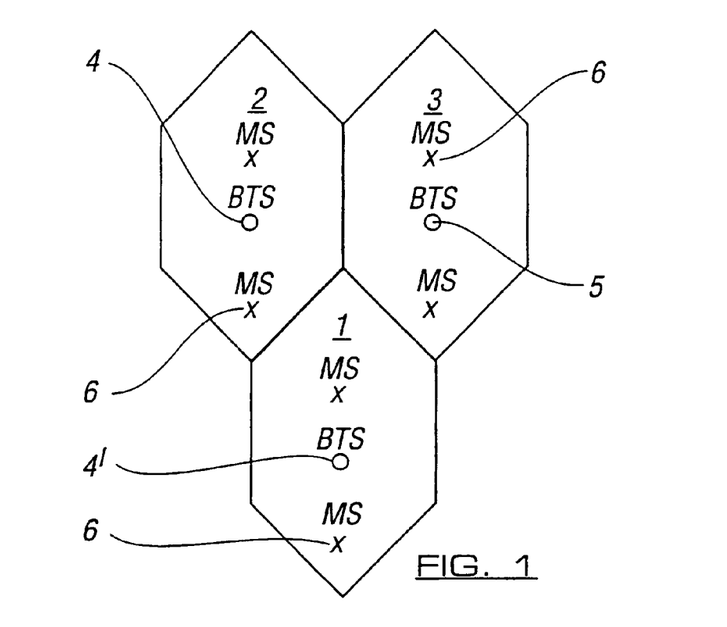
FIG. 1 shows a schematic diagram of a cellular radio network system in which embodiments of the invention can be implemented.

Reference will be first made to FIG. 1 in which three cells 1,2,3 of a cellular telecommunications network are shown. Each cell 1,2,3 is served by a respective base transceiver station (BTS) 4',4,5. Each base transceiver station (BTS) is arranged to transmit signals to and receive signals from the mobile stations (MS) 6 located in the cell associated with the given base transceiver station. Likewise, each mobile station 6 is able to transmit signals to and receive signals from the respective base transceiver station 4',4,5, and also able to move from the coverage area of one cell to the coverage area of another cell, e.g. from cell 2 to cell 3.

The exemplifying cellular telecommunications network will be described in more detail in the following by using the terminology of a proposed Universal Mobile Telecommunications System (UMTS) standard. However, it is to be appreciated that the invention is not restricted to UMTS but can be implemented in any standard. Examples of these include, without any intention to restrict the possible communication systems to these, any of the code division multiple access (CDMA) based systems or any of the time division multiple access (TDMA) based systems or any of the frequency division multiple access (FDMA) based systems or any hybrids thereof.

Figure 2:
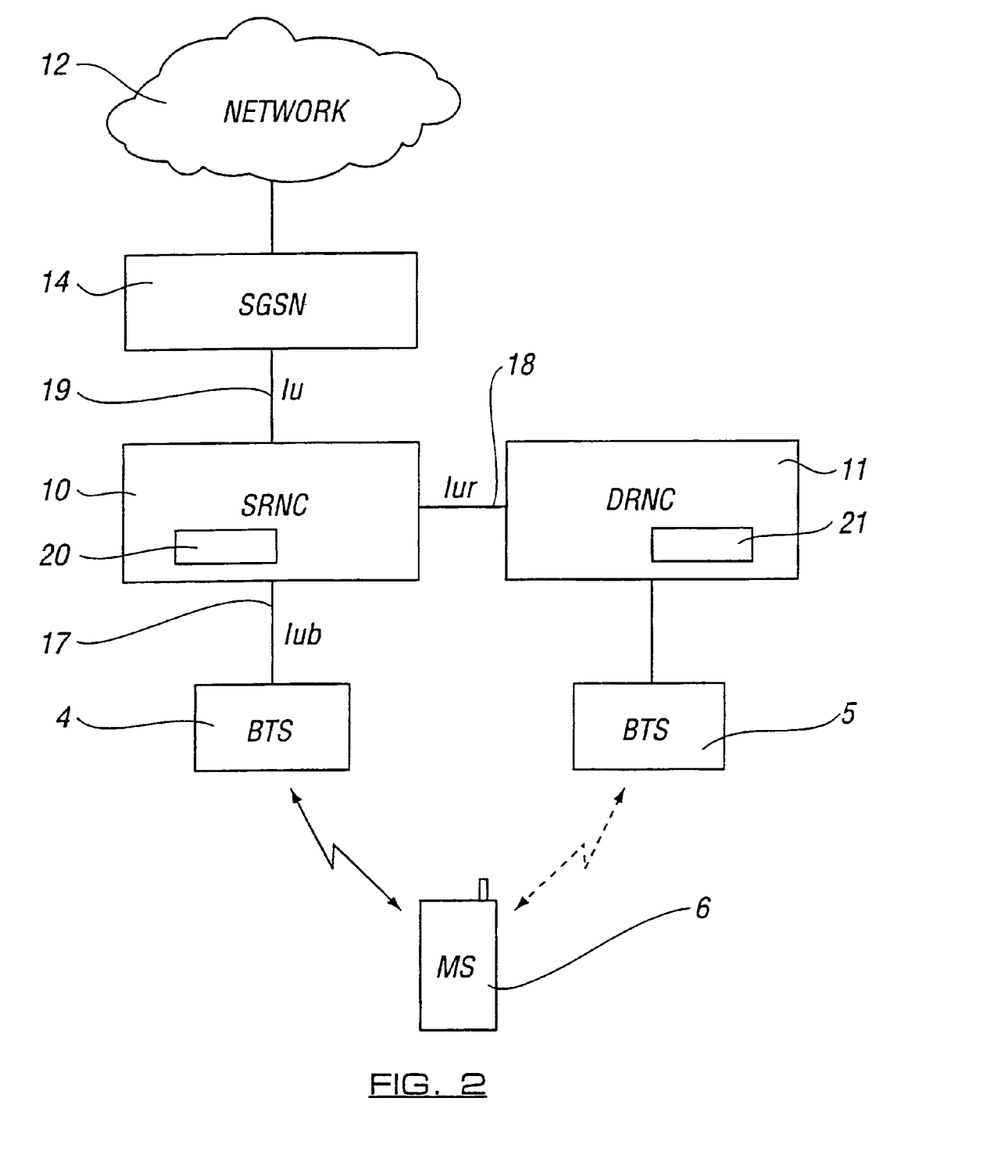
FIG. 2 shows the hierarchy of various elements of the network of FIG. 1.

Reference is now made to FIG. 2 which shows the hierarchy of a cellular communication system. As can be seen, the mobile station 6 is in wireless communication with one of the base stations. Typically a number of mobile stations will be in communication with each base station although only one mobile station is shown in FIG. 2 for clarity. A first base station 4 is connected to a first network controller, which in FIG. 2 is a serving radio network controller SRNC 10. Again, more than one base station is usually connected to each controller 10 although only one is shown for clarity. Typically more than one controller is also provided in a network. The SRNC 10 is connected to other elements of the network 12 via a suitable linking or gateway apparatus, such as a serving GPRS (General Packet radio Service) Support Node (SGSN) 14.

The SRNC 10 is arranged to control the base station, either directly or through an intermediate node (not shown). The controller 10 passes on data to be transmitted to the mobile station by the base station. The controller 10 will also receive from the base station data which the base station has received from the mobile station. The implementation of the communication between the base station, the mobile station and the controller is known, and will thus not be discussed in detail herein. It is sufficient to note that the interface may comprise channels in both uplink and downlink directions. The data may be sent between the mobile station and the controller in any suitable format. The messages sent from the mobile stations may include information identifying the mobile station (for instance, MS ID and/or IMSI (Mobile Station Identity and/or International Mobile Subscriber Identity, respectively)).

In addition to the serving controller (RNC 10), the cellular telecommunications system of FIG. 2 includes another controller RNC 11 controlling the base station 5 of cell 3 of FIG. 2. It is, again, noted that the second controller may also control more than one base station. The second controller may also sometimes be referred to as a drift controller (DRNC). The SNRC 10 and DRNC 11 may communicate with each other over an open Iur interface 18 established between them.

FIG. 2 illustrates one possible relocation situation wherein the mobile station MS 6 or similar user equipment communicates firstly via the BTS 4 over a radio interface designated by a solid line and then switches to communicate via a new BTS 5, as designated by the dashed radio interface. According to one possibility the change from one base station to another may occur after the mobile station 6 has moved into the service or illumination area of the second base station 5. However, it is to be appreciated that in addition to the movement of the mobile station, there are also other possible reasons for triggering the relocation of the connection to another base station or to another network element, such as network optimization, load balancing, hardware congestion, connection quality improvement, fault in the system or base station and so on.

In order to ensure a proper operation of the system and to avoid disconnecting a possibly ongoing call, at least some of the functionalities of the network elements have to be relocated for the connection. For example, when a SRNC functionality is to be located from a first RNC to a second RNC some protocol termination points of an ongoing connection (such as RRC, RCL and/or MAC protocols) need to be changed from the first RNC to the second RNC.

Figure 3:
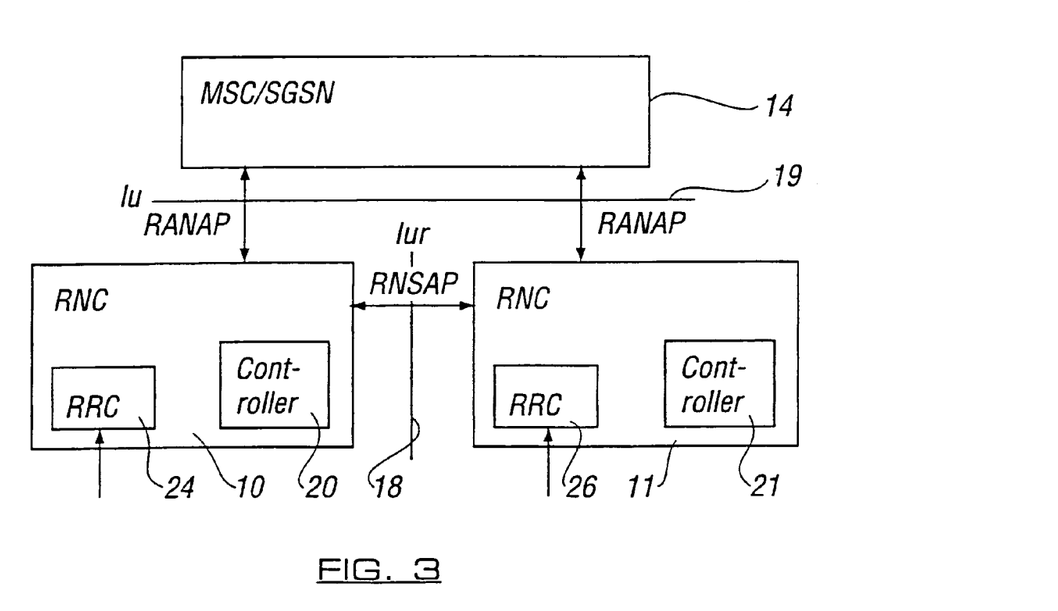
FIG. 3 shows two possible interfaces between network nodes.

Before explaining an embodiment for the relocation in more detail, a brief explanation will given of the protocol termination point with reference to FIG. 3 showing a block diagram of the source RNC 10 and the target RNC 11. The exemplifying protocol termination point is illustrated to comprise a radio resource control (RRC) protocol. However, it is to be appreciated that the described RRC protocol is only an example, and that the embodiments can be implemented for any other protocol used for a connection in a communication system as well. These other protocols include, without any restriction to these, medium access control (MAC) protocol, radio link control (RLC) protocol and packet data convergence protocol (PDCP).

The SRNC 10 and DRNC 11 each are provided with a Radio Resource Controller functionality RRC 24 and 26, respectively. When the MS 6 is in communication with the controller 10, the RRC protocol has its other termination point correspondingly at the controller 10, while the other termination point is at the mobile station. However, should the controller change, the termination point of the RRC protocol should also be changed correspondingly. More precisely, the new controller 11 should be provided with a similar termination point functionality using similar parameters as the previous controller had. These functionalities will be controlled by a controller 20 at the source controller 10 and by a controller 21 at the target controller 11.

FIG. 3 shows further an Iur interface 18 between the DRNC 10 and the SRNC 11. For example, a RNSAP (Radio Network Subsystem Application Part) protocol can be used for the direct signalling between the two RNCs. A RANAP (Radio Access Network Application Part; in the control plane) protocol can used for L3 (Layer 3) signalling over the Iu interface between the RNCs and an appropriate element 14 of the core network 14. The core network element 14 can be e.g. a mobile switching center or a serving GPRS support node.

Figure 4:
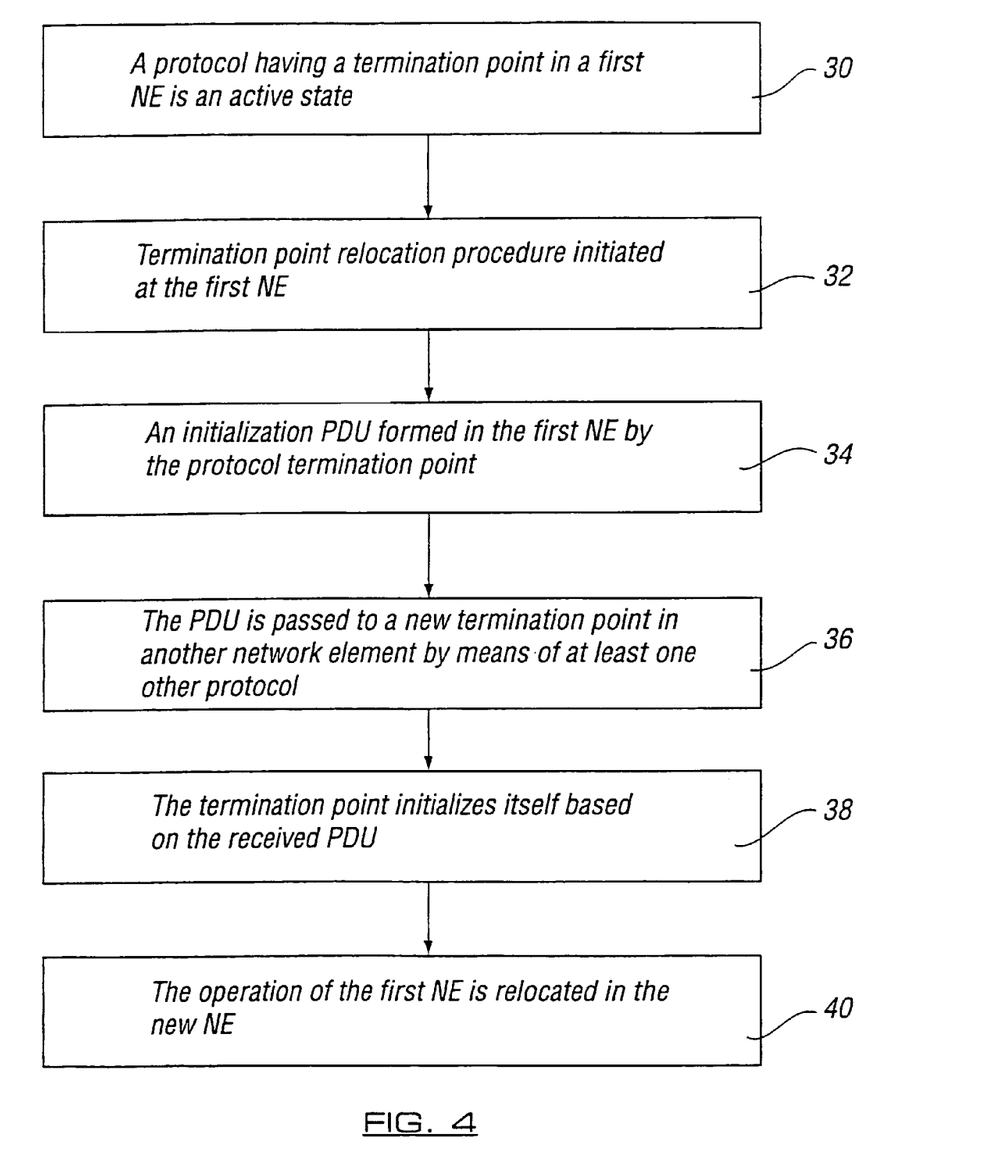
FIG. 4 is a flow chart for operation in accordance with one embodiment.

A reference will now be made to the flow chart of FIG. 4 showing in more detail an embodiment for moving the required state information of a protocol termination point from one termination point at a first network element (NE) to another termination point in a second network element. As illustrated by step 30, the protocol termination point is to be moved between the termination points during an active state of the protocol between the servicing network controller and the mobile station. After the relocation procedures are initiated at step 32, the "old" protocol termination point in the source network element produces at step 34 a special protocol data unit (PDU) containing predefined necessary protocol parameters for initialization of the second termination point before relocation of the connection. The PDU is passed at step 36 to the new termination point with help of a second protocol. The second protocol is used for signaling between the different network elements or nodes. The passed information can be transparent to the second protocol used for the transmission of the PDU. Examples of the protocols which may be used for the transmission of the PDU will be discussed in more detail later in this specification. The new termination point receives the PDU and it is initialized at step 38 based on the information received from the old termination point. After the initialization procedure the termination point will be relocated at step 40 to the new network element and the operation of the system continues as before except that the protocol termination point of the active protocol is now situated in the new network element.

In other words, an explicit protocol message will be passed between the old termination point and the new termination point of a protocol in case of relocation of the protocol termination point. The specified PDU (or message) is used within a protocol peer between the old and the new termination point of the protocol. In a preferred embodiment a single protocol defines the information to be transferred between the protocol peers and the information to be transmitted within one peer. By means of this it is possible to avoid a need for defining a great number of parameters of one protocol in another protocol. For example, by the embodiment described in the following about 100 RRC parameters in the RANAP protocol are avoided.

Referring again to FIG. 3, a more detailed example of the relocation procedure will now be given in context of relocating a radio interface L3 protocol (i.e. a radio resource control; RRC) protocol from a first or source controller (e.g. RNC 10 of FIG. 3) to a second or target controller (e.g. RNC 11 of FIG. 3). The exemplifying RRC protocol is known, and is not described in more detail. It is sufficient to note that the RRC provides common controlling and signaling over the air interface between the serving RNC and the mobile station and that the RRC can be shared with circuit switched traffic and packet switched traffic.

The control unit 20 of the first (source) RNC 10 produces the special protocol initialization unit which in this instance will be referred to as a RRC PDU. The RRC PDU contains all such predefined RRC parameters that have to be known by the new termination point in order to receive and continue the connection. These parameters may include information concerning e.g. one or several of the following: radio bearer(s), transport channel(s), radio link(s) and their physical channels, capability information as well as user equipment capabilities and measurements being reported by the user equipment and so on. According to a preferred embodiment the RRC PDU contains all such RRC parameters that are required by the termination point at the target RNC to start the RRC protocol in a relatively similar state and conditions that existed in the old termination point.

According to an embodiment the generated RRC PDU can be transferred from the first RNC to the second RNC by means of a RNSAP (Radio Network Subsystem Application Part) over an open interface Iur 18 provided between the first controller 10 and the second controller 11. The termination point at the second RNC receives the RRC PDU and subsequently decodes the received RRC PDU. The termination point 26 is initialized based on the received and decoded information. The initialization procedure can be controlled by the control unit 21.

According to another embodiment the PDU is firstly moved from the source RNC 10 to the core network (CN) 14 over an Iu interface 19 by a RANAP (Radio Access Network Application Part) message 'RELOCATION REQUIRED' and subsequently from the core network to the target RNC 11 by an Iu RANAP message 'RELOCATION REQUEST'.

The RRC PDU can be encapsulated within a message in the second protocol as there is no need for the contents of the RRC PDU to be visible for the functionality of the second protocol, such as to the RANAP or the RNSAP. The encapsulation of protocol messages transparently to a message of another protocol is a known technique and will thus not be discussed in more detail herein It should be appreciated that the status of any other protocol, such as the MAC protocol or RLC protocol referred to above, could also be conveyed by the RRC protocol. In more general terms, a protocol may "collect" required information for several protocols and generate a PDU containing required information for all or at least more than one of the protocols to be relocated. According to an embodiment a separate or further protocol initialization unit PDU is used for each of the protocols to be relocated or at least some of the protocols to be relocated. The different protocol initialization units can be transferred between the termination point by protocols that are different to each other.

It should also be appreciated that some embodiments do not require an identical or relatively similar protocol termination point at the old and the new network element. However, it is preferred that the information included in the protocol initialization unit is such that that the functionalities of the communication system may continue without disconnecting the user equipment from the communication system.

According to one possibility the termination point is not relocated from a network element or node to another node but within the node.

It is noted that in some embodiments of the invention, the relocation of some or all functionalities may also be triggered even in such conditions where the communication could continue without any relocation proceedings, e.g. in order to optimize the operation of the system or balance the load distribution in the system. In addition, the mobile station 6 of FIG. 2 may be in communication with both controllers 10 and 11. Furthermore, it may not be necessary to relocate the entire protocol or all protocols used for a connection, but instead only a part of the information concerning the protocols is transmitted between the network elements. For example, a user plane communication may be enabled via the Iur interface 18 of FIG. 2, whereby the mobile station 6 within the service area of the controller 11 could still be controlled by the old servicing controller 10 via the controller 11.

According to a further embodiment the initialization is a bi-directional process. In other words, instead of only transmitting information from the first network element (node) to the second element, the new network element may send a response to the first element or accomplish a transmission to a further network element. The response may include a message such as "unable to initialize", "overload", "all parameters not received" and so on. Upon receiving the response, the first network element may modify its state and/or take some other actions towards the new termination point. For example, transmit modified parameter or parameters, or use a different transmission route, or try to relocate the connection to another network element.

It should also be appreciated that whilst embodiments of the present invention have been described in relation to a connection between the network nodes and a mobile station, embodiments of the present invention are applicable to any other suitable type of connections terminating to one node. It should also be appreciated that base stations can sometimes be referred to as node B.

There are also other possible reasons for initiating the relocation procedure other than movement of the mobile station into a new service area. For example, the network element in question may become overloaded or a failure in the system of the network element itself may force the system to relocate at least a part of the functionalities; for purposes of network optimization; for purposes of load balancing, and so on.

The exemplifying embodiments of the invention have discussed protocols terminated to a network controller. Embodiments of the present invention can be applicable to other network elements as well where applicable.

It is also noted herein that while the above describes one exemplifying embodiment of the invention, there are several variations and modifications which may be made to the disclosed solution without departing from the scope of the present invention as defined in the appended claims.

The invention claimed is:

1. A method comprising:
defining a protocol initialization unit containing predefined information of a first termination point of a radio interface protocol of a communication system by the radio interface protocol;
transferring the protocol initialization unit from the first termination point to a second termination point of the radio interface protocol by a second protocol; and
initializing the second termination point of the radio interface protocol based on the protocol initialization unit.

2. A method according to claim 1, wherein the protocol initialization unit contains state information of the first protocol termination point.

3. A method according to claim 1, wherein the first termination point is located at a first network element of the communication system and the second termination point is located at a second network element of the communication system.

4. A method according to claim 3, wherein the second network element, upon receiving the protocol information unit, generates and transmits a response to the first network element by the second protocol.

5. A method according to claim 1, wherein the protocol initialization unit is encapsulated in a message transmitted between the first termination point and the second termination point by the second protocol.

6. A method according to claim 1, wherein the protocol initialization unit is transparent for the second protocol.

7. A method according to claim 1, wherein the protocol initialization unit is transmitted via a third network element between the termination points.

8. A method according to claim 7, wherein the transmission is based on a radio access network application part protocol.

9. A method according to claim 1, wherein the protocol initialization unit is transmitted by a direct connection between the termination points.

10. A method according to claim 9, wherein the transmission is based on a radio network subsystem application part protocol.

11. A method according to claim 1, wherein the predefined information of the radio interface protocol comprise one or several parameters of a radio resource control protocol, medium access control protocol, radio link control protocol, and/or packet data convergence protocol.

12. A method according to claim 1, wherein the protocol initialization unit contains information of at least one further protocol.

13. A method according to claim 1, further comprising:
defining at least one further protocol initialization unit containing predefined information of a further protocol by the further protocol; and
transferring the further protocol initialization unit from the first termination point to the second termination point.

14. A method according to claim 13, wherein the further protocol initialization unit is transferred between the termination points by a protocol that is different from the second protocol.

15. A method according to claim 1, wherein at least one of the termination points is located at one of the following: a base station controller, a radio network controller, a base station, a gateway.

16. A method according to claim 1, wherein the initializing the second termination point comprises setting the parameters of the second termination point into a state that is similar to the parameters of the first termination point before or at the time the method is initiated.

17. A communication system, comprising:
a first protocol termination point of a radio interface protocol;
a second protocol termination point of the radio interface protocol;
a controller for relocating the radio interface protocol from the first protocol termination point to the second protocol termination point of the radio interface protocol, said controller being arranged to form a protocol initialization unit containing predefined information of the radio interface protocol at the first protocol termination point;
a communication path based on a second protocol between the first and the second termination points of the radio interface protocol for transferring the protocol initialization unit; and
a controller for initializing the second protocol termination point of the radio interface protocol based on the protocol initialization unit.

18. A communication system according to claim 17, wherein the protocol initialization unit contains state information of the first protocol termination point.

19. A communication system according to claim 17, wherein the controller for relocating is arranged to encapsulate the protocol initialization unit into a message to be transmitted from the first termination point to the second termination point.

20. A communication system according to claim 17, wherein the first termination point is located at a first network element of the communication system and the controller for relocating is arranged in connection with the first network element.

21. A communication system according to claim 17, wherein the second termination point is located at a second network element of the communication system and the controller for initializing is arranged in connection with the second network element.

22. A communication system according to claim 17, wherein the protocol initialization unit contains information of at least one further protocol.

23. A network element for use in a communication network, comprising:
a protocol termination point of a radio interface protocol;
a controller for relocating the radio interface protocol from the protocol termination point of the radio interface protocol to another protocol termination point of the radio interface protocol, said controller being arranged to form a protocol initialization unit containing predefined information of the radio interface protocol at the protocol termination point; and
an interface to said another protocol termination point of the radio interface protocol based on a second protocol for transferring the protocol initialization unit from the first termination point by the second protocol.

24. A network element according to claim 23, wherein the network element comprises a controller of a cellular communication network.

25. A network element according to claim 23, wherein the controller for relocating is arranged to encapsulate the protocol initialization unit into a message to be transmitted from the first termination point by the second protocol.

26. A network element according to claim 23, wherein the protocol initialization unit contains information of at least one further protocol.

27. A network element for use in a communication network, comprising:
a radio interface protocol termination point of a radio interface protocol;
an interface to another protocol termination point of the radio interface protocol for receiving a protocol initialization unit containing predefined information of the radio interface protocol at said another protocol termination point of the radio interface protocol, wherein the interface is based on a second protocol; and
a controller means for initializing the radio interface protocol termination point based on the received protocol initialization unit.

28. A network element according to claim 27, wherein the network element comprises a controller of a cellular communication network.

29. A communication system, comprising:
a first protocol termination point of a radio interface protocol;
a second protocol termination point of the radio interface protocol;

means for relocating the radio interface protocol from the first protocol termination point to the second protocol termination point of the radio interface protocol, said means for relocating being arranged to form a protocol initialization unit containing predefined information of the radio interface protocol at the first protocol termination point;

means for transferring the protocol initialization unit from the first protocol termination point to the second protocol termination point based on a second protocol; and means for initializing the second protocol termination point of the radio interface protocol based on the protocol initialization unit.

30. A communication system according to claim 29, wherein the protocol initialization unit contains state information of the first protocol termination point.

31. A network element for use in a communication network, comprising:

a protocol termination point of a radio interface protocol;

means for relocating the radio interface protocol from the protocol termination point of the radio interface protocol to another protocol termination point of the radio interface protocol, said means for relocating being arranged to form a protocol initialization unit containing predefined information of the radio interface protocol at the protocol termination point; and means for transferring the protocol initialization unit from the protocol termination point to the another protocol termination point based on a second protocol.

32. A network element according to claim 31, wherein the means for relocating are arranged to encapsulate the protocol initialization unit into a message to be transmitted from the first termination point by the second protocol.

33. A network element for use in a communication network, comprising:

a radio interface protocol termination point of a radio interface protocol;

means for receiving a protocol initialization unit containing predefined information of the radio interface protocol at another termination point of the radio interface protocol, wherein said means for receiving are based on a second protocol; and means for initializing the radio interface protocol termination point based on the received protocol initialization unit.

34. A network element according to claim 33, wherein the network element comprises a controller of a cellular communication network.

* * * * *

UNITED STATES PATENT AND TRADEMARK OFFICE
CERTIFICATE OF CORRECTION

PATENT NO. : 7,242,933 B1 Page 1 of 1
APPLICATION NO. : 10/088452
DATED : June 10, 2007
INVENTOR(S) : Ahmavaara It is certified that error appears in the above-identified patent and that said Letters Patent is hereby corrected as shown below:

At column 10, line 57, claim 27, line 11, please remove the word "means".

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,242,933 B1 | Page 1 of 1 |
| APPLICATION NO. | : 10/088452 | |
| DATED | : July 10, 2007 | |
| INVENTOR(S) | : Ahmavaara | |

It is certified that error appears in the above-identified patent and that said Letters Patent is hereby corrected as shown below:

At column 10, line 57, claim 27, line 11, please remove the word "means".

This certificate supersedes Certificate of Correction issued November 13, 2007.

Signed and Sealed this

Eighteenth Day of December, 2007

JON W. DUDAS
*Director of the United States Patent and Trademark Office*